(12) United States Patent
Liu

(10) Patent No.: US 12,231,821 B2
(45) Date of Patent: Feb. 18, 2025

(54) DISPLAY METHOD, DISPLAY DEVICE AND COMPUTER-READABLE STORAGE MEDIUM

(71) Applicant: GOERTEK INC., Shandong (CN)

(72) Inventor: Dean Liu, Shandong (CN)

(73) Assignee: Goertek Optical Technology Co., Ltd, Shandong (CN)

( * ) Notice: Subject to any disclaimer, the term of this patent is extended or adjusted under 35 U.S.C. 154(b) by 93 days.

(21) Appl. No.: 17/996,839

(22) PCT Filed: Jun. 23, 2020

(86) PCT No.: PCT/CN2020/097633
§ 371 (c)(1),
(2) Date: Oct. 21, 2022

(87) PCT Pub. No.: WO2021/212647
PCT Pub. Date: Oct. 28, 2021

(65) Prior Publication Data
US 2023/0156164 A1    May 18, 2023

(30) Foreign Application Priority Data

Apr. 23, 2020   (CN) .......................... 202010330823.6

(51) Int. Cl.
*H04N 9/31*   (2006.01)
*G02B 26/10*  (2006.01)

(52) U.S. Cl.
CPC ......... *H04N 9/3129* (2013.01); *G02B 26/101* (2013.01); *H04N 9/3164* (2013.01)

(58) Field of Classification Search
CPC ... H04N 9/3129; H04N 9/3164; G02B 26/101
See application file for complete search history.

(56) References Cited

U.S. PATENT DOCUMENTS

| 9,087,248 | B2  | 7/2015 | Kwan |
| 2009/0059338 | A1  | 3/2009 | Endo |
| 2013/0070213 | A1* | 3/2013 | Chikaoka ............... G09G 3/025 353/69 |

FOREIGN PATENT DOCUMENTS

| CN | 101860706 A | 10/2010 |
| CN | 201662678 U | 12/2010 |

(Continued)

OTHER PUBLICATIONS

International Search Report from International Application No. PCT/CN2020/097633 mailed Jan. 27, 2021.

*Primary Examiner* — Yassin Alata
(74) *Attorney, Agent, or Firm* — Shih IP Law Group, PLLC

(57) ABSTRACT

A display method, a display device and a computer-readable storage medium are disclosed for solving low resolution problem in display imaging of display devices assembled with Micro LEDs in the prior art. The display method is applied to the display device comprising an imaging assembly having at least one light source body and a scanning mirror located in a light path of light emitted from the light source body. The display method comprises: obtaining the resolution of an image to be displayed (S100); determining swing information of the scanning mirror and an output frequency of outputting a light beam from the light source body according to the resolution, the swing information comprises a swing frequency equal to the output frequency (S200); controlling the scanning mirror to swing according to the swing information and controlling the light source body to output light beam information according to the output frequency (S300).

14 Claims, 8 Drawing Sheets

(56) References Cited

FOREIGN PATENT DOCUMENTS

| | | |
|---|---|---|
| CN | 102087414 A | 6/2011 |
| CN | 102117001 A | 7/2011 |
| CN | 102401998 A | 4/2012 |
| CN | 102540670 A | 7/2012 |
| CN | 102855833 A | 1/2013 |
| CN | 105527789 A | 4/2016 |
| CN | 205427318 U | 8/2016 |
| CN | 109587461 A | 4/2019 |
| CN | 110383827 A | 10/2019 |
| EP | 2574058 A2 | 3/2013 |

\* cited by examiner

DISPLAY METHOD, DISPLAY DEVICE AND COMPUTER-READABLE STORAGE MEDIUM

TECHNICAL FIELD

The present disclosure relates to a technical field of imaging display, in particular to a display method, a display device and a computer-readable storage medium.

BACKGROUND ART

A Micro Light-Emitting Diode (Micro LED) refers to a micro-sized LED array integrated on a chip. The power consumption of the Micro LED is far less than that of a Liquid Crystal Display (LCD). Compared with the Liquid Crystal Display (LCD), the Micro LED may be of self-illumination without backlight, and has advantages of lower energy consumption, simple structure and small volume, etc. However, due to the difficulty of assembly of the Micro LED, the existing display panel using the Micro LED cannot perform high-resolution imaging, as a result, the imaging resolution of the display device assembled with the Micro LED is low.

The above content is only used to assist in understanding the technical solution of the present disclosure, and does not mean that the above content belongs to the prior art.

SUMMARY

The present disclosure provides a display method, a display device and a computer-readable storage medium, and is intended to solve the problem of low resolution in display imaging of the display device assembled with the Micro LED in the prior art.

In order to achieve the above object, the present disclosure provides a display method applied to a display device, the display device comprises an imaging assembly, the imaging assembly comprises a scanning mirror and at least one light source body, the scanning mirror is located in a light path of light emitted from the light source body, and the display method comprises:

obtaining a resolution of an image to be displayed;

determining swing information of the scanning mirror and an output frequency of outputting a light beam from the light source body according to the resolution, wherein the swing information comprises a swing frequency, and the swing frequency is equal to the output frequency; and controlling the scanning mirror to swing according to the swing information and controlling the light source body to output light beam information according to the output frequency.

Optionally, the imaging assembly comprises a plurality of light source bodies, each of which is used to display different image contents, an image to be displayed is composed of the image contents displayed by each of the plurality of light source bodies, and wherein determining the swing information of the scanning mirror and the output frequency of outputting the light beam from the light source body according to the resolution comprises:

determining the image contents displayed by the light source bodies respectively according to the resolution and a number of the light source bodies;

determining the swing information according to the image contents and preset irradiation ranges of the light source bodies; and determining output frequencies of the light source bodies according to the swing information.

Optionally, determining the swing information according to the image contents and the preset irradiation ranges of the light source bodies comprises:

determining a swing angle range of the scanning mirror according to the image contents and the preset irradiation ranges of the light source bodies; and determining the swing frequency according to the swing angle range and the preset irradiation ranges.

Optionally, determining the swing frequency according to the swing angle range and the irradiation ranges comprises:

obtaining an image frame rate of the image to be displayed; and determining the swing frequency according to the preset irradiation ranges, the swing angle range and the image frame rate.

Optionally, controlling the scanning mirror to swing according to the swing information and controlling the light source body to output the light beam information according to the output frequency comprises:

controlling the scanning mirror to swing according to the swing frequency and a preset swing sequence of the scanning mirror, and controlling the light source body to output the light beam information according to the output frequency.

Optionally, after controlling the scanning mirror to swing according to the swing information and controlling the light source body to output the light beam information according to the output frequency, the display method further comprises:

obtaining first abnormal information fed back by the light source body; and adjusting the light beam information output from the light source body according to the first abnormal information.

Optionally, after controlling the scanning mirror to swing according to the swing information and controlling the light source body to output the light beam information according to the output frequency, the display method further comprises:

obtaining second abnormal information fed back by the scanning mirror; and adjusting a scanning angle of the scanning mirror according to the second abnormal information.

In order to achieve the above object, the present application provides a display device which includes an imaging assembly, and the imaging assembly comprises a light source body and a scanning mirror, wherein light emitted from the light source body is transmitted to the scanning mirror, and the light is transmitted to an imaging surface after being reflected by the scanning mirror.

Optionally, the light source body is a light-emitting diode, a micro organic light-emitting semiconductor, a micro light-emitting diode, a mini light-emitting diode or a liquid crystal display.

Optionally, the scanning mirror is a micro electro mechanical scanning mirror.

In order to achieve the above object, the present application provides a computer-readable storage medium on which a display program is stored, wherein the display program is configured to, when executed by a processor, perform steps of the display method of any of the technical solutions described above The present disclosure provides a display method applied to a display device, the display device comprises an imaging assembly, the imaging assembly comprises a scanning mirror and at least one light source body, and a light emitting direction of the light source body directs to the scanning mirror. When the display device displays an image, a resolution of an image to be displayed is obtained firstly; then swing information of the scanning mirror and an output frequency of outputting a light beam from the light source body is determined according to the resolution, wherein the swing information comprises a swing frequency, and the swing frequency is equal to the output frequency; and then the scanning mirror is controlled to swing according to the swing information to adjust a swing angle of the scanning mirror, and the light source body is controlled to output light beam information according to the output frequency. When the display device displays the image, the light emitted from the light source body is transmitted to the scanning mirror, and is transmitted to an imaging surface after being reflected by the scanning mirror, so as to display the image. By the mutual cooperation of the light source body and the scanning mirror, the display range of the displayed image projected by the light source body is increased, so that the problem of low resolution in display imaging of the display device assembled with the Micro LED in the prior art is solved.

BRIEF DESCRIPTION OF THE DRAWINGS

In order to illustrate the technical solutions in the embodiments of the present disclosure or the prior art more clearly, the attached drawings that need to be used in the descriptions of the embodiments of the present disclosure or the prior art will be briefly described below. It is obvious that the attached drawings in the following description are only some embodiments of the present disclosure. For those skilled in the art, other drawings can be obtained according to the structures shown in these attached drawings without creative labor.

Figure 1:
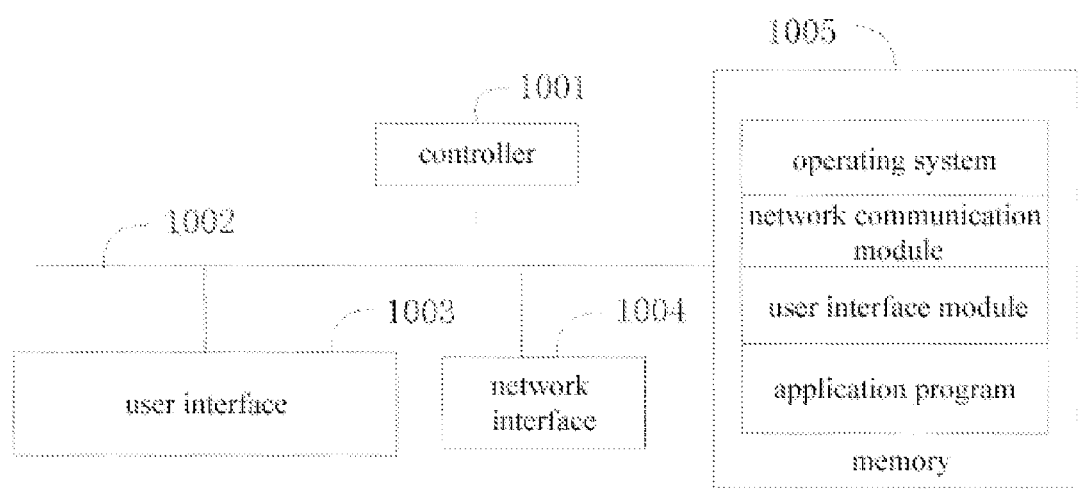
FIG. 1 is a schematic diagram of a terminal structure of a hardware operating environment involved in the technical solutions of the embodiments of the present disclosure.

The realization of the objects, functional features and advantages of the present disclosure will be further described with reference to the attached drawings in combination with the embodiments.

DETAILED DESCRIPTION OF EMBODIMENTS

The technical solutions in the embodiments of the present disclosure will be clearly and completely described below in combination with the attached drawings in the embodiments of the present disclosure. Obviously, the described embodiments are only a part of the embodiments of the present disclosure, not all of them. Based on the embodiments in the present disclosure, all other embodiments obtained by those skilled in the art without creative labor belong to the protection scope of the present disclosure.

It should be noted that all directional indications (for example, on, below, left, right, front, and rear) in the embodiments of the present disclosure are only used to illustrate the relative position relationship and motion situation between various components under a specific attitude (as shown in the drawings), and the directional indications will change accordingly when the specific attitude is changed.

In addition, the description such as "first", "second" and the like in the present disclosure is only for descriptive objects, and cannot be understood as indicating or implying the relative importance of the indicated technical feature or implicitly indicating the number of the indicated technical feature. Therefore, the feature defined with "first" or "second" may explicitly or implicitly comprise at least one such feature. In the description of the present disclosure, "a plurality of" means at least two (for example, two, three, etc.), unless otherwise expressly and specifically defined.

In the present disclosure, the terms such as "connected", "fixed" and the like should be understood in a broad sense, unless otherwise expressly specified and defined. For example, "fixed" may mean "fixedly connected", "detachably connected", or "integrated with"; it may mean "mechanically connected" or "electrically connected"; it may mean "directly connected" or "indirectly connected through an intermediate medium"; and it may mean the intercommunication within two elements or the interaction relationship between two elements, unless otherwise expressly defined. For those skilled in the art, the specific meaning of the above terms in the present disclosure can be understood according to the specific situation.

In addition, the technical solutions between various embodiments of the present disclosure can be combined with each other, but it must be based on the condition that those skilled in the art can realize the combination. When a combination of technical solutions is contradictory or impossible to realize, it should be considered that this combination of the technical solutions does not exist and is not within the protection scope of the present disclosure.

It should be understood that the specific embodiments described herein are only used to explain the present disclosure and are not used to limit the present disclosure.

As shown in FIG. 1, FIG. 1 is a schematic diagram of a device structure of a hardware operating environment involved in the technical solutions of the embodiments of the present disclosure.

As shown in FIG. 1, the device may comprise a controller 1001 (for example, CPU), a network interface 1004, a user interface 1003, a memory 1005 and a communication bus 1002. Among them, the communication bus 1002 is used to realize the connection communication between these components. The user interface 1003 may comprise a display, and an input unit such as a keyboard. Optionally, the user interface 1003 may further comprise a standard wired interface and a standard wireless interface. Optionally, the network interface 1004 may comprise a standard wired interface and a standard wireless interface (for example, a Wi-Fi interface). The memory 1005 may be a high-speed RAM memory or a non-volatile memory (for example, disk memory). Optionally, the memory 1005 may be a storage device independent of the aforementioned controller 1001.

Those skilled in the art can understand that the device structure shown in FIG. 1 does not constitute a limitation to the device, and may comprise more or fewer components than those shown in the drawings, or combinations of some components, or different component arrangements.

As shown in FIG. 1, as a computer storage medium, the memory 1005 may comprise an operating system, a network communication module, a user interface module and an application program therein.

In the server shown in FIG. 1, the network interface 1004 is mainly used to connect to the background server for data communicate with the background server; the user interface 1003 is mainly used to connect to the client (user side) for data communicate with the client; and the controller 1001 may be used to call the application program stored in the memory 1005 and perform the following operations:

obtaining a resolution of an image to be displayed;

determining swing information of a scanning mirror and an output frequency of outputting a light beam from a light source body according to the resolution, wherein the swing information comprises a swing frequency, and the swing frequency is equal to the output frequency; and controlling the scanning mirror to swing according to the swing information, and controlling the light source body to output light beam information according to the output frequency.

Further, the controller 1001 may call the application program stored in the memory 1005 and further perform the following operations:

determining image contents displayed by the light source bodies respectively according to the resolution and a number of the light source bodies;

determining the swing information according to the image contents and preset irradiation ranges of the light source bodies; and determining output frequencies of the light source bodies according to the swing information.

Further, the controller 1001 may call the application program stored in the memory 1005 and further perform the following operations:

determining a swing angle range of the scanning mirror according to the image contents and the preset irradiation ranges of the light source bodies; and determining the swing frequency according to the swing angle range and the preset irradiation ranges.

Further, the controller 1001 may call the application program stored in the memory 1005 and further perform the following operations:

obtaining an image frame rate of the image to be displayed; and determining the swing frequency according to the preset irradiation ranges, the swing angle range and the image frame rate.

Further, the controller 1001 may call the application program stored in the memory 1005 and further perform the following operations:

controlling the scanning mirror to swing according to the swing frequency and a preset swing sequence of the scanning mirror and controlling the light source body to output the light beam information according to the output frequency.

Further, the controller 1001 may call the application program stored in the memory 1005 and further perform the following operations:

obtaining first abnormal information fed back by the light source body; and adjusting the light beam information output from the light source body according to the first abnormal information.

Further, the controller 1001 may call the application program stored in the memory 1005 and further perform the following operations:

obtaining second abnormal information fed back by the scanning mirror; and adjusting a scanning angle of the scanning mirror according to the second abnormal information.

The present application provides a display method, a display device and a computer-readable storage medium.

Embodiment 1

Figure 2:
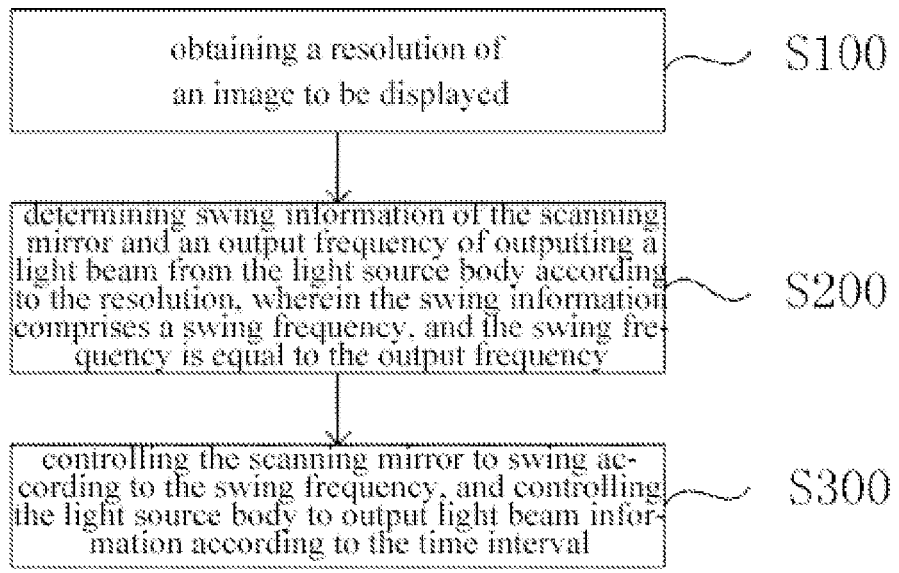
FIG. 2 is a schematic flowchart of the display method of the embodiment 1 of the present disclosure.

Referring to FIG. 2, the display method is applied to the display device which comprises an imaging assembly, the imaging assembly comprises a scanning mirror and at least one light source body, a light emitting direction of the light source body directs to the scanning mirror, and the display method comprises:

S100: obtaining a resolution of an image to be displayed, wherein the image to be displayed is a image of which display information needs to be displayed through the imaging assembly, specifically, the resolution of the image to be displayed is the precision of the image to be displayed, and indicates a number of pixels contained in the image to be displayed;

S200: determining swing information of the scanning mirror and an output frequency of outputting a light beam from the light source body according to the resolution, wherein the swing information comprises a swing frequency, and the swing frequency is equal to the output frequency; and S300: controlling the scanning mirror to swing according to the swing information, and controlling the light source body to output light beam information according to the output frequency.

In the display method, after the resolution of the image to be displayed is determined, the swing information of the scanning mirror and the output frequency of outputting the light beam from the light source body may be determined according to the resolution. The swing information comprises the swing frequency and a swing angle range. The swing frequency refers to swing times of the scanning mirror per unit time, the swing angle range refers to the angle range that the scanning mirror needs to swing during the process of displaying the image, and the output frequency refers to a number of times that the light source body outputs light beams per unit time. During the process of displaying the image, the scanning mirror constantly swings during the operating process, so as to reflect the output light beam of the light source body to different positions. In a specific embodiment, the swing frequency of the scanning mirror is equal to the frequency of the output light beam of the light source body. When light beams are output continuously for many times from the light source body, the scanning mirror swings to different swing angles according to different light beams, so that different light beams are transmitted to different display positions.

The present disclosure provides a display method applied to a display device. The display device comprises an imaging assembly which comprises a scanning mirror and at least one light source body. A light emitting direction of the light source body directs to the scanning mirror. When the display device displays an image, a resolution of the image to be displayed is obtained firstly; then swing information of the scanning mirror and an output frequency of outputting a light beam from the light source body is determined according to the resolution, wherein the swing information comprises a swing frequency, and the swing frequency is equal to the output frequency; and then the scanning mirror is controlled to swing according to the swing information to adjust a swing angle of the scanning mirror, and the light source body is controlled to output light beam information according to the output frequency. When the display device displays the image, the light emitted from the light source body is transmitted to the scanning mirror, and is transmitted to an imaging surface after being reflected by the scanning mirror, so as to display the image. By the mutual cooperation of the light source body and the scanning mirror, the display range of the displayed image projected by the light source body is increased, so that the problem of low resolution in display imaging of the display device assembled with the Micro LED in the prior art is solved.

Embodiment 2

Figure 3:
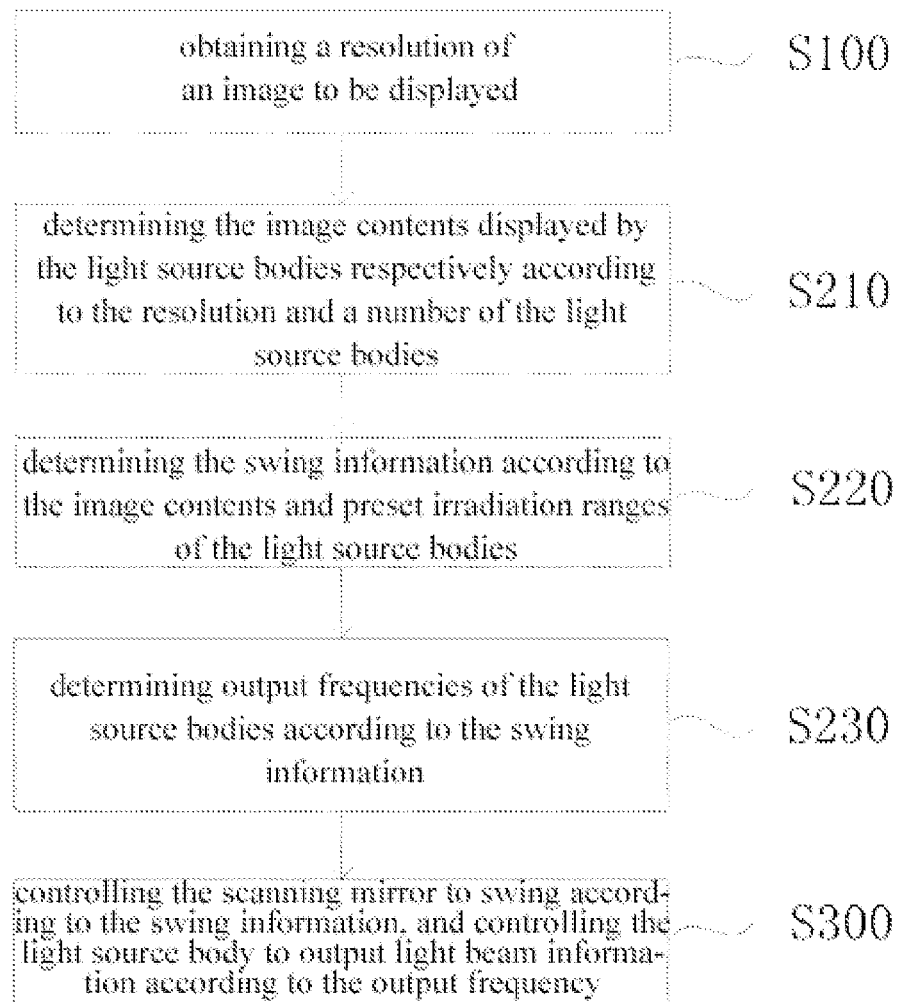
FIG. 3 is a schematic flowchart of the display method of the embodiment 2 of the present disclosure.

Referring to FIG. 3, the imaging assembly comprises a plurality of light source bodies, each of which is used to display different image contents, an image to be displayed is composed of the image contents displayed by each of the plurality of light source bodies, and the above step S200 in the embodiment 1 comprises following steps:

S210: determining the image contents displayed by the light source bodies respectively according to the resolution and a number of the light source bodies, Here, the imaging assembly may comprise the plurality of light source bodies so as to facilitate the operation of the imaging assembly. In a preferred embodiment, the plurality of light source bodies are uniformly distributed along transverse and longitudinal directions. When the image is displayed through the plurality of light source bodies, the image to be displayed may be segmented into different image contents, and each of the image contents is imaged by one scanning mirror and at least one of the light source bodies. Specifically, the scanning mirrors correspond to the light source bodies one by one, or a scanning mirror is provided to be matched with the plurality of light source bodies. Specifically, when the scanning mirrors correspond to the light source bodies one by one, a number of the scanning mirrors is the same as a number of the light source bodies. The light emitted from each of the light source bodies is reflected by the corresponding scanning mirror and projects the image content. The image to be displayed is composed of the image contents projected by each of the plurality of light source bodies. When a scanning mirror is matched with the plurality of light source bodies, the output light beams of the plurality of light source bodies are transmitted to the scanning mirror, and transmitted to different positions of the imaging surface after being reflected by the scanning mirror, so as to avoid the problem that the light spots formed by the output light beams on the imaging surface coincide, which may lead to ghosting of the image displayed by the display device, S220: determining the swing information according to the image contents and preset irradiation ranges of the light source bodies.

Here, for the swing frequency and the swing information, when the image is displayed through the light source bodies, after determining the image contents corresponding to the light source bodies, the swing information of the scanning mirror may be determined according to the preset irradiation ranges of the light source bodies. In a specific embodiment, when the size of the image content is 20*10 pixels, it is determined that the preset irradiation range of the light source body is 2*1 pixels. Therefore, when the image content is displayed through the light source body, the scanning mirror needs to swing 10 times to achieve the image display of the image content, thus it is determined that the swing frequency of the scanning mirror is 10*n Hz, where n is a positive integer.

S230: determining output frequencies of outputting light beams from the light source bodies according to the swing information.

Here, after determining the swing frequency, since the frequency of the output light beam from the light source body is equal to the swing frequency of the scanning mirror, the output frequency of outputting the light beam from the light source body is equal to the swing frequency. After determining the swing frequency of the scanning mirror and the output frequency of outputting the light beam from the light source body, the scanning mirror and the light source bodies are controlled, so as to achieve the imaging display of the image to be displayed.

Embodiment 3

Figure 4:
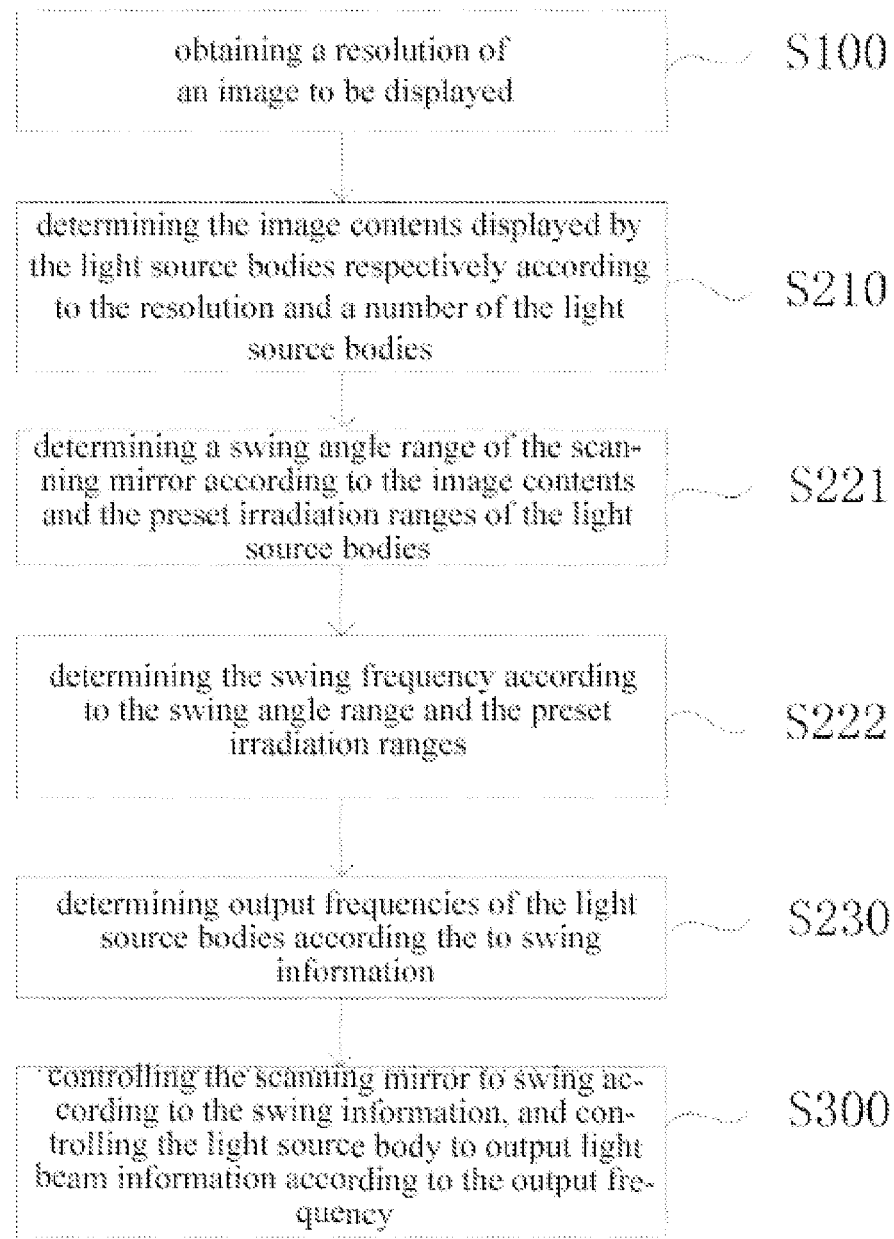
FIG. 4 is a schematic flowchart of the display method of the embodiment 3 of the present disclosure.

Referring to FIG. 4, the above step S220 in the embodiment 2 comprises:

S221: determining a swing angle range of the scanning mirror according to the image contents and the irradiation ranges of the light source bodies; and S222: determining the swing frequency according to the swing angle range and the preset irradiation ranges.

Here, after determining the image contents and the irradiation ranges of the light source bodies, the swing frequency of the scanning mirror may be determined according to the image contents and the irradiation ranges. Since the swing angle for each swing of the scanning mirror is an independent value, the swing angle range of the scanning mirror when the image is displayed may be determined according to the swing angle and the swing frequency for each swing of the scanning mirror. In a specific embodiment, when the size of the image content is 20*10 pixels, the irradiation range of the light source body is 2*1 pixels. It is determined that the swing frequency of the scanning mirror is 10*n Hz, where n is a positive integer. When the single swing angle of the scanning mirror is 0.5 degrees, the swing angle range of the scanning mirror is 0.5*10=5 degrees. After determining the swing angle range, the swing frequency may be determined according to the single swing angle and the swing angle range.

Embodiment 4

Figure 5:
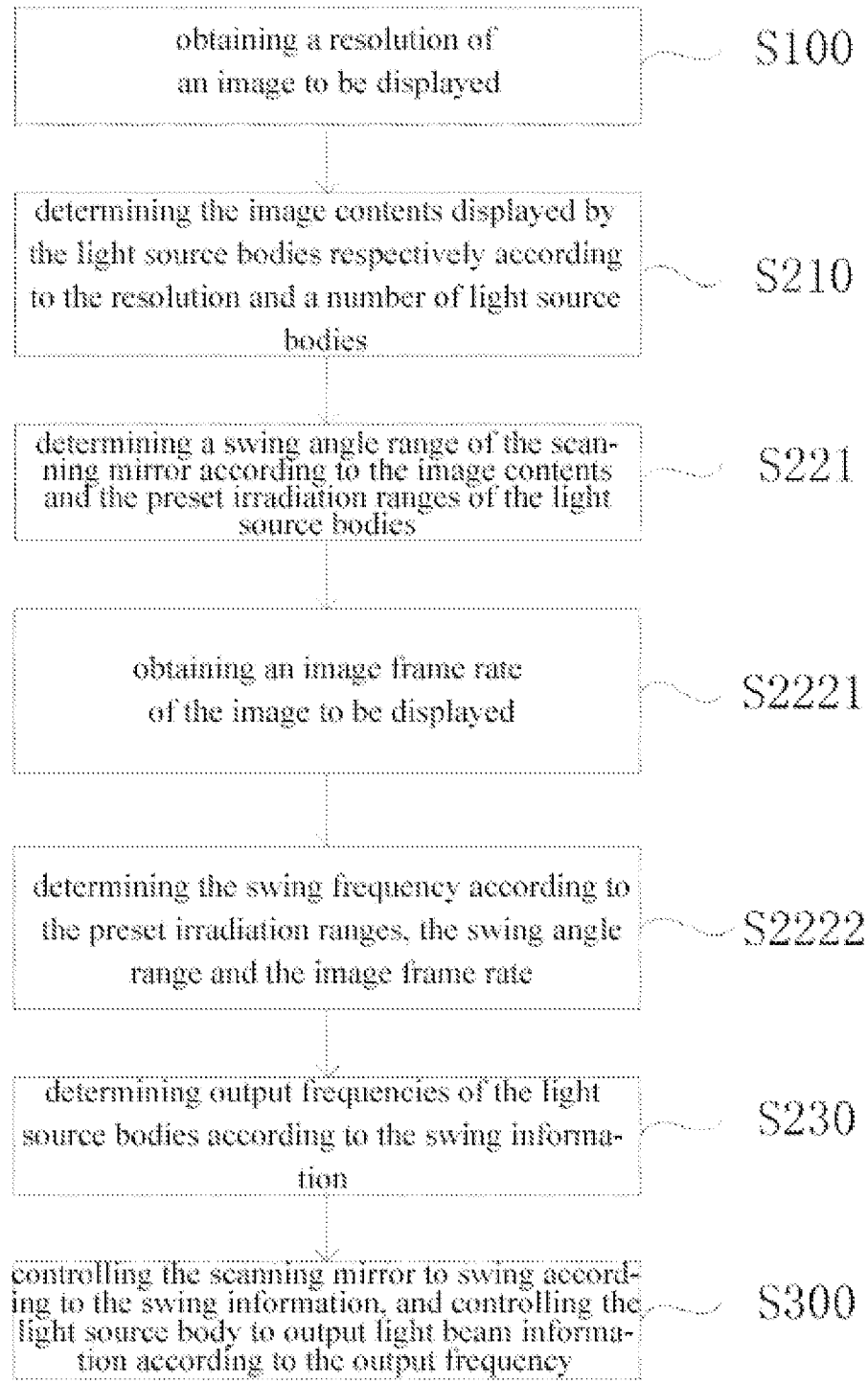
FIG. 5 is a schematic flowchart of the display method of the embodiment 4 of the present disclosure.

Referring to FIG. 5, the above step S221 in the embodiment 3 comprises:

S2211: obtaining an image frame rate of the image to be displayed;

S2212: determining the swing frequency according to the irradiation ranges, the swing angle range and the image frame rate.

Here, in order to facilitate the user to observe the displayed image, the display device usually refreshes the displayed image at a certain frequency when displaying the displayed image. Specifically, when the image frame rate of the displayed image is low or is less than 24 Hz, the user can observe the flicker of the displayed image through the human eye. When the image frame rate of the displayed image is greater than 24 Hz, the user cannot perceive the refresh of the displayed image, so it does not affect the user's observation of the displayed image. Specifically, after obtaining the image frame rate of the displayed image, the swing frequency may be determined according to the irradiation ranges, the swing angle and the image frame rate. In a specific embodiment, when the image content is 20*10 pixels, the irradiation range of the light source body is 2*1 pixels. It is determined that the swing frequency of the scanning mirror is 10*n Hz, where n is the image frame rate. When the image frame rate is 60 Hz, the swing frequency is 10*60=600 Hz.

Embodiment 5

Figure 6:
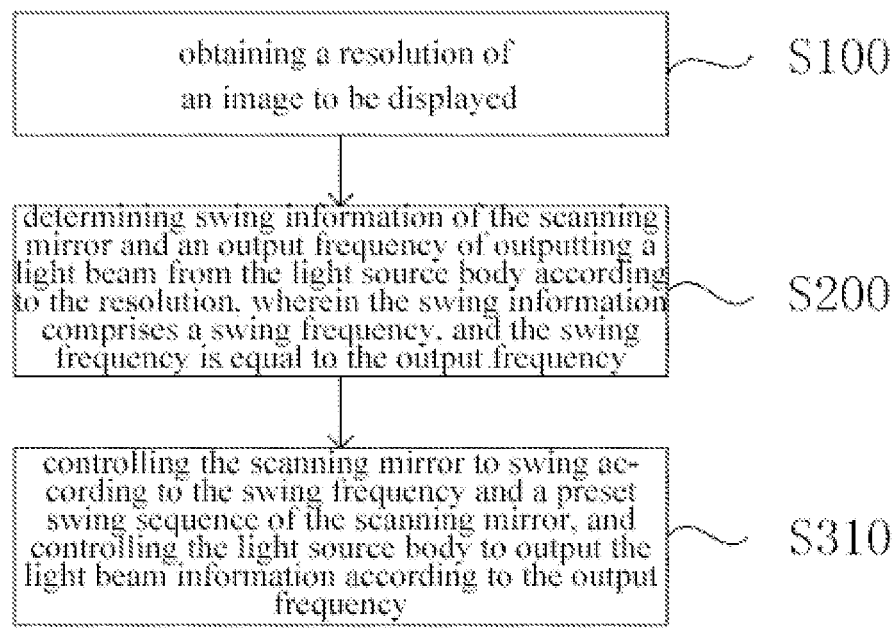
FIG. 6 is a schematic flowchart of the display method of the embodiment 5 of the present disclosure.

Referring to FIG. 6, the above step S300 in the embodiment 1 comprises:

S310: controlling the scanning mirror to swing according to the swing frequency and preset swing sequence information of the scanning mirror to adjust the swing angle of the scanning mirror, and controlling the light source body to output the light beam information according to the output frequency.

Here, the preset swing sequence refers to the swing sequence of the scanning mirror during the swing process. Specifically, when the scanning mirror swings along the one-dimensional direction, the preset swing sequence may be a swing sequence from left to right or from top to bottom, or a swing sequence specified by the user. When the scanning mirror swings along the two-dimensional direction, the preset swing sequence may be a sequence from left to right and then from top to bottom, or a sequence from top to bottom and then from left to right, or any other sequence. When the scanning mirror swings, the light source body outputs a light beam corresponding to the swing angle, so that the display device performs image display.

Embodiment 6

Figure 7:
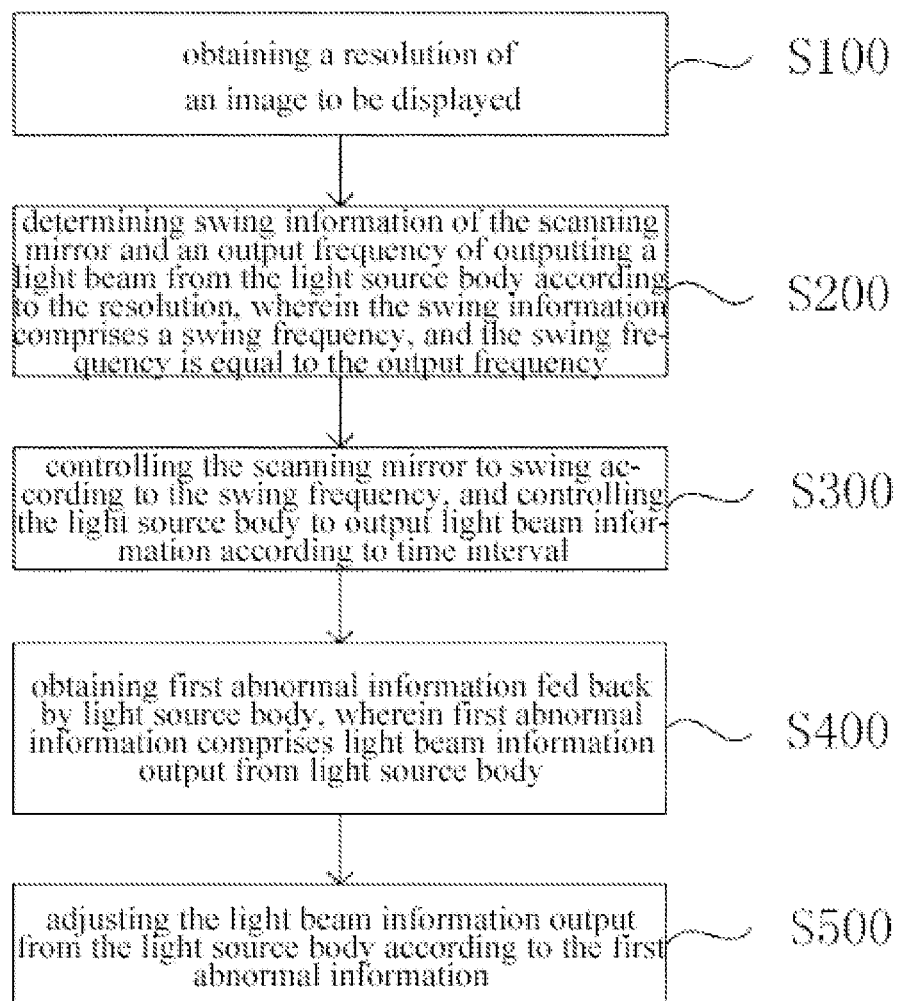
FIG. 7 is a schematic flowchart of the display method of the embodiment 6 of the present disclosure.

Referring to FIG. 7, after the above step S300 in the embodiment 1, the display method further comprises:

S400: obtaining first abnormal information fed back by the light source body; and S500: adjusting the light beam information output from the light source body according to the first abnormal information.

Here, when the image is displayed through the display device, the light source body outputs the light beam information according to the output frequency. When the light source body outputs the light beam information abnormally, the light source body sends the first abnormal information to the controller of the display device. The first abnormal information comprises but is not limited to the light beam information output from the light source body and the corresponding abnormal information. After receiving the first abnormal information, the controller adjusts the light beam information output from the light source body according to the first abnormal information, so that the light source body can output accurate light beam information.

Embodiment 7

Figure 8:
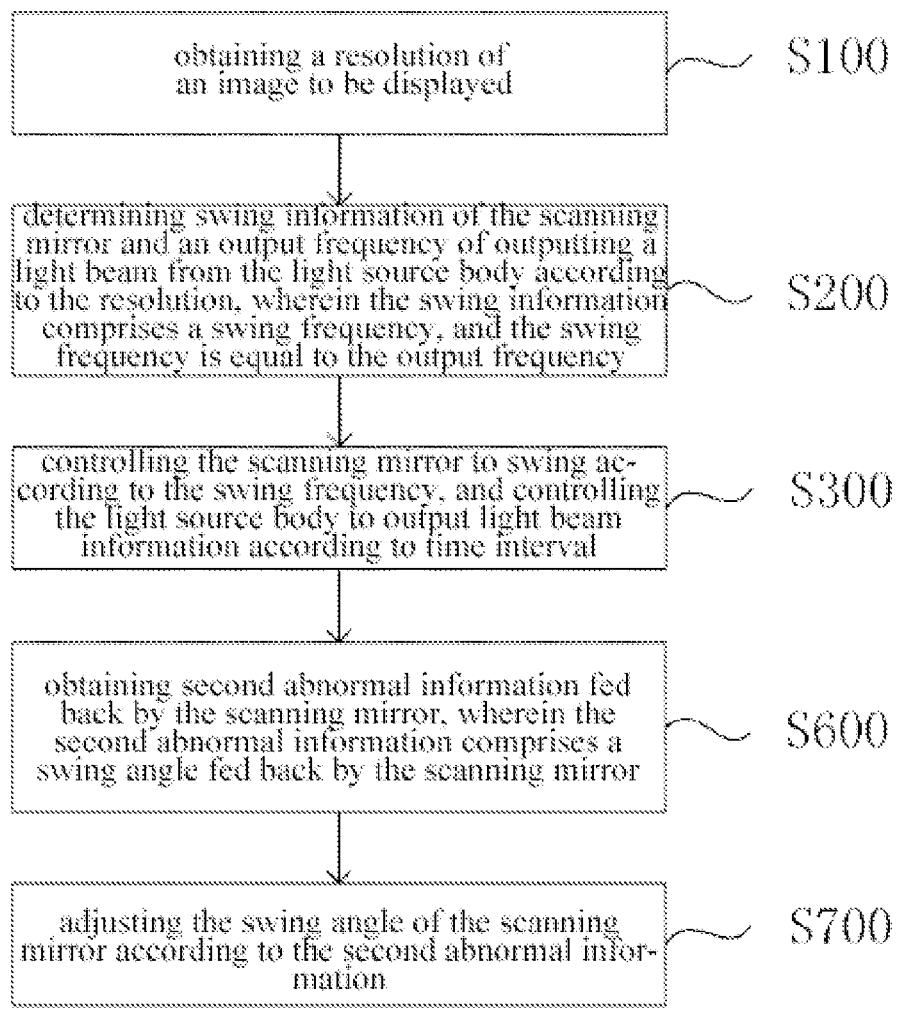
FIG. 8 is a schematic flowchart of the display method of the embodiment 7 of the present disclosure.

Referring to FIG. 8, after the above step S300 in the embodiment 1, the display method further comprises:

S600: obtaining second abnormal information fed back by the scanning mirror; and S700: adjusting the swing angle of the scanning mirror according to the second abnormal information.

Here, when the image is displayed through the display device, the scanning mirror swings according to the scanning information. When the swing angle, swing frequency or swing sequence of the scanning mirror is abnormal, the scanning mirror sends the second abnormal information to the controller of the display device. The second abnormal information comprises but is not limited to the swing angle, swing frequency or swing sequence of the scanning mirror and the corresponding abnormal information. After receiving the second abnormal information, the controller adjusts the abnormal scanning information of the scanning mirror according to the second abnormal information, so that the scanning mirror swings according to the accurate swing angle, swing frequency or swing sequence.

In order to achieve the above objects, the present application also provides a display device which comprises an imaging assembly, and the imaging assembly comprises a light source body and a scanning mirror, wherein light emitted from the light source body is transmitted to the scanning mirror, and the light is transmitted to an imaging surface after being reflected by the scanning mirror.

In optional embodiments, the light source body may be a light-emitting diode (LED), an organic light-emitting diode (OLED), a micro light-emitting diode (Micro LED), a mini light-emitting diode (Micro LED) or a liquid crystal display (LCD). It can be understood that the light source body may also be laser light sources with different wavelengths or other light source bodies that can emit light beams.

In optional embodiments, the scanning mirror is a micro electro mechanical system (MEMS) scanning mirror. It can be understood that the selection of the scanning mirror is not limited thereto. In other embodiments, the scanning mirror may also be a polyhedral scanning mirror or other mirrors that can realize high-speed vibration.

In order to achieve the above objects, the present application also provides a computer-readable storage medium on which a display program is stored, wherein the display program is configured to, when executed by a processor, perform the steps of the display method of any of the embodiments described above.

In some optional embodiments, the processor may be a central processing unit (CPU), and may also be a general-purpose processor, a digital signal processor (DSP), an application specific integrated circuit (ASIC), a field programmable gate array (FPGA), or other programmable logic devices, discrete gates or transistor logic devices, discrete hardware components, etc. The general-purpose processor may be a microprocessor, or the processor may also be any conventional processor, etc.

The memory may be an internal storage unit of the device, for example, a hard disk or memory of the device. The memory may also be an external storage device for the device, for example, a plug-in hard disk, smart media card (SMC), secure digital (SD) card, flash card and the like equipped on the device. Further, the memory may also comprise both an internal storage unit of the device and an external storage device. The memory is used for storing the computer program and other programs and data required by the device. The memory may also be used to temporarily store data that has been output or will be output.

Those skilled in the art can clearly understand that for the convenience and concision of description, only the division of the above-mentioned functional units and modules is illustrated. In practical application, the above-mentioned functions may be allocated to different functional units and modules according to needs, that is, the internal structure of the device may be divided into different functional units or modules to complete all or part of the above-mentioned functions. The functional units and modules in the embodiments may be integrated in one processing unit, or each unit may exist independently, or two or more units may be integrated in one unit. The above integrated units may be realized in the form of hardware, or in the form of software functional unit. In addition, the specific names of the functional units and modules are only for the convenience of mutual distinction, and are not used to limit the protection scope of the present application. The specific operating process of units and modules in the above system may refer to the corresponding process in the above method embodiments, which will not be repeated here.

The above embodiments are only the preferred embodiments of the present disclosure, and do not limit the patent scope of the present disclosure. Under the disclosure concept of the present disclosure, the equivalent structural transformation made by using the contents of the description and drawings of the present disclosure, and the direct/indirect application in other relevant technical fields all fall into the patent protection scope of the present disclosure.

What is claimed:

1. A display method, wherein the display method is applied to a display device, the display device comprises an imaging assembly comprising a scanning mirror and a plurality of light source bodies, and the scanning mirror is located in a light path of light emitted from a light source body of the plurality of light source bodies, each of which is used to display different image contents, an image to be displayed is composed of the image contents displayed by each of the plurality of light source bodies, and the display method comprises:
   obtaining a resolution of an image to be displayed;
   determining the image contents displayed by the plurality of light source bodies, respectively, according to the resolution and a number of the plurality of light source bodies;
   determining the-swing information according to the image contents and preset irradiation ranges of the plurality of light source bodies; and
   determining output frequencies of the plurality of light source bodies according to the swing information, wherein the swing information comprises a swing frequency, and the swing frequency is equal to the output frequency; and
   controlling the scanning mirror to swing according to the swing information and controlling the light source body to output light beam information according to the output frequency.

2. The display method according to claim 1, wherein determining the swing information according to the image contents and the preset irradiation ranges of the plurality of light source bodies comprises:
   determining a swing angle range of the scanning mirror according to the image contents and the preset irradiation ranges of the plurality of light source bodies; and
   determining the swing frequency according to the swing angle range and the preset irradiation ranges.

3. The display method according to claim 2, wherein determining the swing frequency according to the swing angle range and the irradiation ranges comprises:
   obtaining an image frame rate of the image to be displayed; and
   determining the swing frequency according to the preset irradiation ranges, the swing angle range and the image frame rate.

4. The display method according to claim 1, wherein controlling the scanning mirror to swing according to the swing information and controlling the light source body to output the light beam information according to the output frequency comprises:
   controlling the scanning mirror to swing according to the swing frequency and a preset swing sequence of the scanning mirror and controlling the light source body to output the light beam information according to the output frequency.

5. The display method according to claim 1, wherein after controlling the scanning mirror to swing according to the swing information and controlling the light source body to output the light beam information according to the output frequency, the display method further comprises:
   obtaining first abnormal information fed back by the light source body; and
   adjusting the light beam information output from the light source body according to the first abnormal information.

6. The display method according to claim 1, wherein after controlling the scanning mirror to swing according to the swing information and controlling the light source body to output the light beam information according to the output frequency, the display method further comprises:
   obtaining second abnormal information fed back by the scanning mirror; and
   adjusting a swing angle of the scanning mirror according to the second abnormal information.

7. The display device according to claim 1, wherein the plurality of light source bodies are uniformly distributed along transverse and longitudinal directions, and the image to be displayed is segmented into different image contents.

8. The display device according to claim 7, wherein the number of scanning mirrors is the same as the number of the light source bodies.

9. The display device according to claim 7, wherein the scanning mirror is provided to be matched with the plurality of light source bodies, and the output light beams of the plurality of light source bodies are transmitted to the scanning mirror, and transmitted to different positions of an imaging surface after being reflected by the scanning mirror.

10. The display device according to claim 1, wherein the image content and the preset irradiation range are represented by pixels.

11. A display device, comprising an imaging assembly including a plurality of light source bodies and a scanning mirror, wherein light emitted from a light source body of the plurality of light source bodies is transmitted to the scanning mirror, and the light is transmitted to an imaging surface after being reflected by the scanning mirror, the scanning mirror swings according to swing information, each of the plurality of light source bodies is used to display different image contents, an image to be displayed is composed of the image contents displayed by each of the plurality of light source bodies, the plurality of light source bodies are configured to output light beam information according to an output frequency,
   wherein the swing information comprises a swing frequency, and the swing frequency is equal to the output frequency,
   wherein the swing information and the output frequency are obtained according to the resolution of an image to be displayed,
   wherein the swing information is determined according to the image contents and preset irradiation ranges of the plurality of light source bodies, and wherein the image contents displayed by the light source bodies respectively is determined according to the resolution and a number of the plurality of light source bodies.

12. The display device according to claim 11, wherein the light source body is a light-emitting diode, a micro organic light-emitting semiconductor, a micro light-emitting diode, a mini light-emitting diode or a liquid crystal display.

13. The display device according to claim 11, wherein the scanning mirror is a micro electro mechanical scanning mirror.

14. A computer-readable non-transitory storage medium on which a display program is stored, wherein the display program is configured to, when executed by a processor, perform steps of the display method according to claim 1.

* * * * *